US012370123B2

(12) United States Patent
Wang

(10) Patent No.: US 12,370,123 B2
(45) Date of Patent: Jul. 29, 2025

(54) CONTROL BOX AND MASSAGE WATER POOL

(71) Applicant: ORIENTAL RECREATIONAL PRODUCTS (SHANGHAI) CO., LTD, Shanghai (CN)

(72) Inventor: Zhiyue Wang, Shanghai (CN)

(73) Assignee: Oriental Recreational Products (Shanghai) Co., Ltd, Shanghai (CN)

( * ) Notice: Subject to any disclaimer, the term of this patent is extended or adjusted under 35 U.S.C. 154(b) by 820 days.

(21) Appl. No.: 17/639,827

(22) PCT Filed: Aug. 14, 2020

(86) PCT No.: PCT/CN2020/109124
§ 371 (c)(1),
(2) Date: Mar. 2, 2022

(87) PCT Pub. No.: WO2021/042966
PCT Pub. Date: Mar. 11, 2021

(65) Prior Publication Data

US 2022/0241148 A1 Aug. 4, 2022

(30) Foreign Application Priority Data

Sep. 3, 2019 (CN) ......................... 201910827756.6

(51) Int. Cl.
*A61H 33/02* (2006.01)
*A61H 3/00* (2006.01)
(Continued)

(52) U.S. Cl.
CPC ....... *A61H 33/028* (2013.01); *A61H 33/0087* (2013.01); *A61H 33/026* (2013.01);
(Continued)

(58) Field of Classification Search
CPC .... A61H 33/02; A61H 33/022; A61H 33/028; A61H 33/0087; A61H 33/008;
(Continued)

(56) References Cited

U.S. PATENT DOCUMENTS 9,254,240 B2 * 2/2016 Lin .......................... A47K 3/06
10,357,427 B1 7/2019 Le et al.
(Continued)

FOREIGN PATENT DOCUMENTS

CN 203634453 6/2014
CN 203962354 11/2014
(Continued)

OTHER PUBLICATIONS

"English translation of International Search Report of the China National Intellectual Property Administration", PCT International Application No. PCT/CN2020/109124 completed Nov. 2, 2020, mailed Nov. 9, 2020, Beijing China (2 pages).

*Primary Examiner* — Kendra D Carter
*Assistant Examiner* — Jaeick Jang
(74) *Attorney, Agent, or Firm* — Woods Oviatt Gilman LLP; Katherine H. McGuire, Esq.

(57) ABSTRACT

Disclosed is a control box. The control box is internally provided with a first chamber, and the first chamber is used for accommodating a control component. The control box is also internally provided with an air supply system for supplying air to a water pool body. The air supply system comprises an air suction part having a housing, the housing is provided with an air inlet and an air outlet, and the air inlet is communicated with the first chamber; the air suction part further comprises an air pump provided in the housing, and when the air pump is started, air in the first chamber can be suctioned into the housing by means of the air inlet. The air supply system further comprises a valve part provided with
(Continued)

a pipeline, the pipeline is provided with an air intake port and an air supply port, the air intake port is communicated with the air outlet of the housing, and the air supply port is used for being communicated with the water pool body; when the valve part is opened, the air suctioned into the housing can flow into the water pool body along the pipeline. According to the present invention, the working environment in the first chamber can be kept dry, so that the service life of the control component is prolonged. The present invention further provides a massage water pool.

17 Claims, 3 Drawing Sheets

(51) Int. Cl.

| | |
|---|---|
| ***A61H 33/00*** | (2006.01) |
| ***E04H 4/00*** | (2006.01) |
| ***E04H 4/14*** | (2006.01) |
| ***F04D 19/00*** | (2006.01) |

(52) U.S. Cl.
CPC ............ *E04H 4/0025* (2013.01); *E04H 4/14* (2013.01); *A61H 2201/0103* (2013.01); *A61H 2201/1246* (2013.01); *F04D 19/002* (2013.01)

(58) Field of Classification Search
CPC ...... A61H 2033/022; A61H 2033/0062; E04H 4/00; E04H 4/0025; E04H 4/14
See application file for complete search history.

(56) References Cited

U.S. PATENT DOCUMENTS

| | | | | |
|---|---|---|---|---|
| 2006/0207018 | A1* | 9/2006 | Lev | A61H 33/02 4/622 |
| 2009/0241252 | A1* | 10/2009 | Li | A61H 33/02 4/541.1 |
| 2017/0290737 | A1* | 10/2017 | Kim | F04D 1/06 |

FOREIGN PATENT DOCUMENTS

| | | |
|---|---|---|
| CN | 109424221 | 3/2019 |
| CN | 208845793 | 5/2019 |
| CN | 211058396 | 7/2020 |
| JP | 2012223395 | 11/2012 |

* cited by examiner

CONTROL BOX AND MASSAGE WATER POOL

TECHNICAL FIELD

The present invention relates to the technical field of leisure and entertainment equipment, in particular to a control box and a massage water pool.

BACKGROUND

In current urban life, due to the fact that the pace of life is fast and working pressure is high, more leisure modes are needed to improve the pleasure of life. Compared with a traditional water pool, a massage water pool has the massage and leisure functions, and people can relax the body and mind and enjoy life during bathing, so that the massage water pool is generally welcomed by people.

The massage water pool includes water pool body and a control box, wherein an air supply system is arranged in the control box and used for supplying air to the water pool body (including inflating the water pool body and spraying bubbles into the water pool body). In the control box, a large number of control components (such as a circuit board, a switch, or an electrical pipeline) are arranged and used for controlling the operation of the air supply system and other systems (such as a water circulation system). In the prior art, because the internal environment of the control box is relatively humid, the control components are easy to damage.

SUMMARY

An objective of the present invention is to keep the internal environment of the control box dry.

Therefore, an implementation mode of the present invention discloses a control box. The control box is internally provided with a first chamber used for accommodating control components, and is also internally provided with an air supply system for supplying air to a water pool body. The air supply system includes an air suction part provided with a housing, wherein the housing is provided with an air inlet and an air outlet, and the air inlet communicates with the first chamber; the air suction part further includes an air pump arranged in the housing, and when the air pump is started, air in the first chamber can be suctioned into the housing by means of the air inlet. The air supply system further includes a valve part provided with a pipeline, wherein the pipeline is provided with an air intake port and an air supply port, the air intake port communicates with the air outlet of the housing, and the air supply port is used for communicating with the water pool body; and when the valve part is started, the air suctioned into the housing can flow into the water pool body along the pipeline.

According to another specific implementation mode of the present invention, the implementation mode of the present invention discloses a control box. The air suction part is adjacent to the first chamber in a horizontal direction.

According to another specific implementation mode of the present invention, the implementation mode of the present invention discloses a control box. The air pump is arranged in an inverted mode, the air inlet is formed in a top wall of the housing, and an air pumping end of the air pump is arranged opposite to the air inlet.

According to another specific implementation mode of the present invention, the implementation mode of the present invention discloses a control box. A bearing part and a shoulder part located above the bearing part are arranged on an inner wall of the housing, and the air pump is fixed in the housing through the shoulder part and the bearing part.

According to another specific implementation mode of the present invention, the implementation mode of the present invention discloses a control box. Air holes are formed in a bottom wall of the first chamber.

According to another specific implementation mode of the present invention, the implementation mode of the present invention discloses a control box. The air outlet of the housing is located in a bottom wall of the housing, and the air outlet of the housing is adjacent to one side wall of the control box.

According to another specific implementation mode of the present invention, the implementation mode of the present invention discloses a control box. The valve part is located below the housing.

According to another specific implementation mode of the present invention, the implementation mode of the present invention discloses a control box. The control box is used for a massage water pool; the air supply port at least includes a first air supply port and a second air supply port, wherein the first air supply port is used for spraying bubbles into a water pool body of the massage water pool, and the second air supply port is used for inflating the water pool body.

According to another specific implementation mode of the present invention, the implementation mode of the present invention discloses a control box. The center line of the pipeline and the center line of the air pump are located in the same vertical plane.

According to another specific implementation mode of the present invention, the implementation mode of the present invention discloses a control box. The valve part is a check valve.

According to another specific implementation mode of the present invention, the implementation mode of the present invention discloses a control box. An air filter is arranged at the air inlet.

According to another specific implementation mode of the present invention, the implementation mode of the present invention discloses a control box. A water circulation pipeline is further arranged in the first chamber of the control box.

An implementation mode of the present invention further discloses a massage water pool which includes the control box disclosed by any embodiment.

The control box disclosed by the implementation mode of the present invention includes the first chamber which is used for accommodating the control components. The control box further includes the air supply system used for supplying air to the water pool body. The air pump of the air supply system suctions air from the first chamber instead of directly suctioning air from the outside of the control box as in the prior art, so that circulation and renewal of air in the first chamber can be realized, the first chamber has a dry working environment, and the service lives of the control components accommodated in the first chamber can be prolonged.

DETAILED DESCRIPTION

Implementation modes of the present invention are illustrated by specific embodiments below, and those skilled in the art can easily understand other advantages and effects of the present invention according to the content disclosed in the specification. Although the description of the present invention will be introduced in conjunction with preferred embodiments, this does not represent that the features of the present invention are only limited in the embodiments. On the contrary, the description of the present invention in conjunction with the implementation modes is intended to cover other alternatives or modifications that may be extended based on the claims of the present invention. In order to thoroughly understand the present invention, the following description will contain many specific details. The present invention may also be implemented without using these details. In addition, in order to avoid confusion or obscuring of the key point of the present invention, some specific details are omitted in the description.

Figure 1:
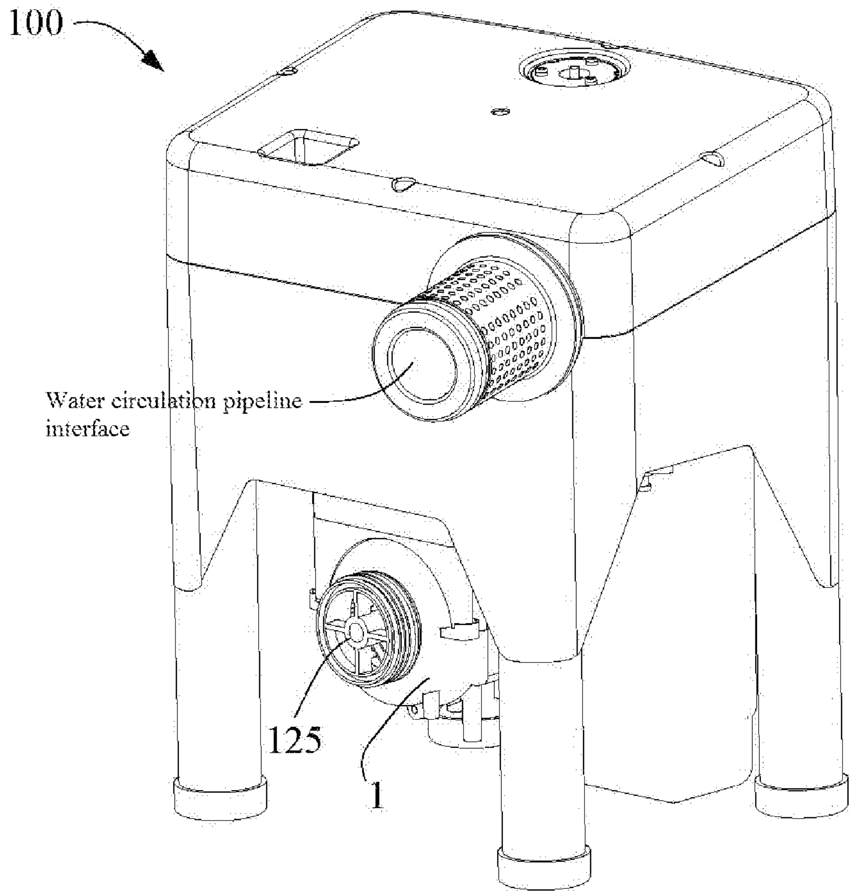
FIG. 1 is an axonometric view of a control box provided by an embodiment of the present invention.
Figure 2:
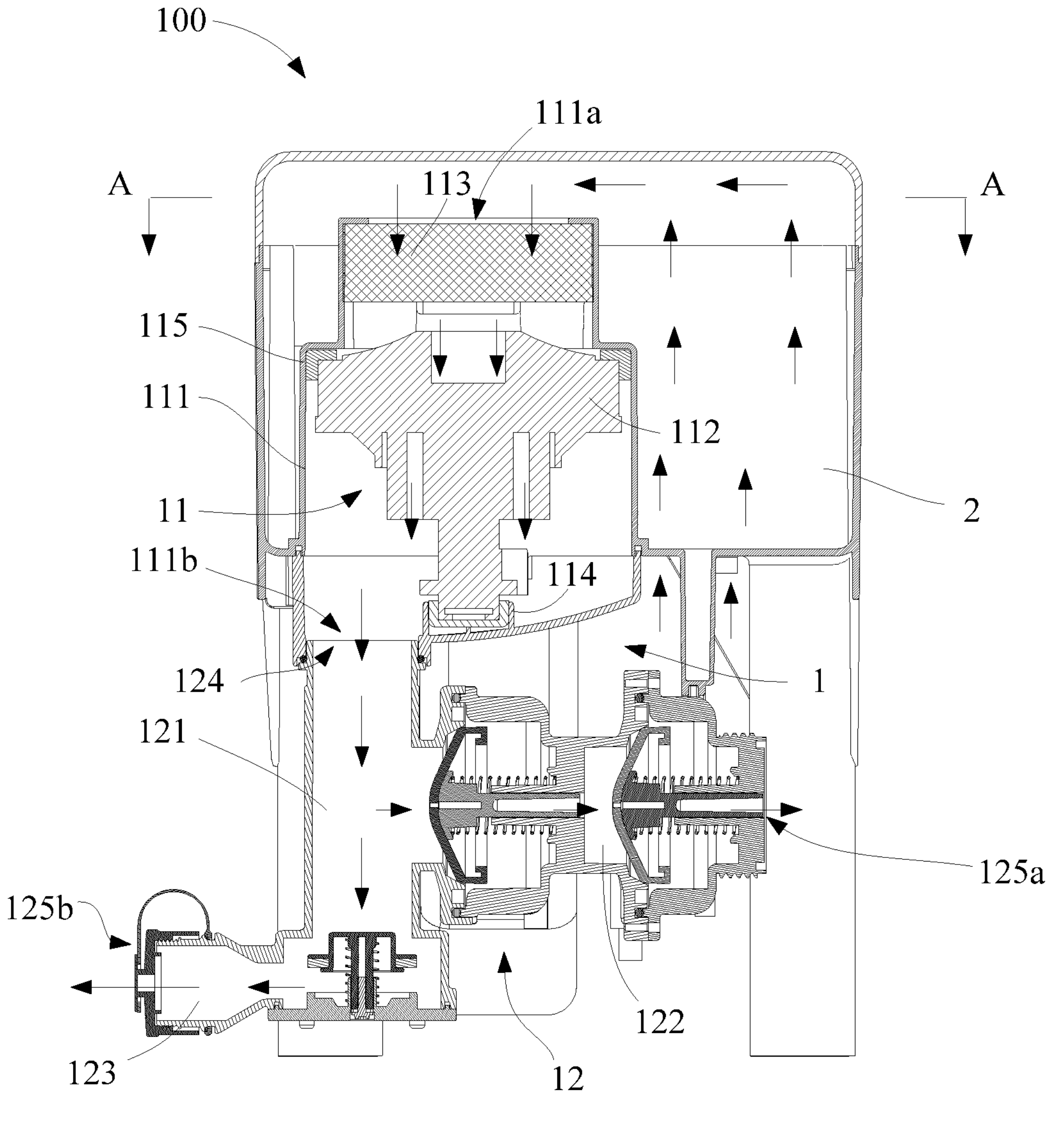
FIG. 2 is a section view of a control box provided by an embodiment of the present invention.
Figure 3:
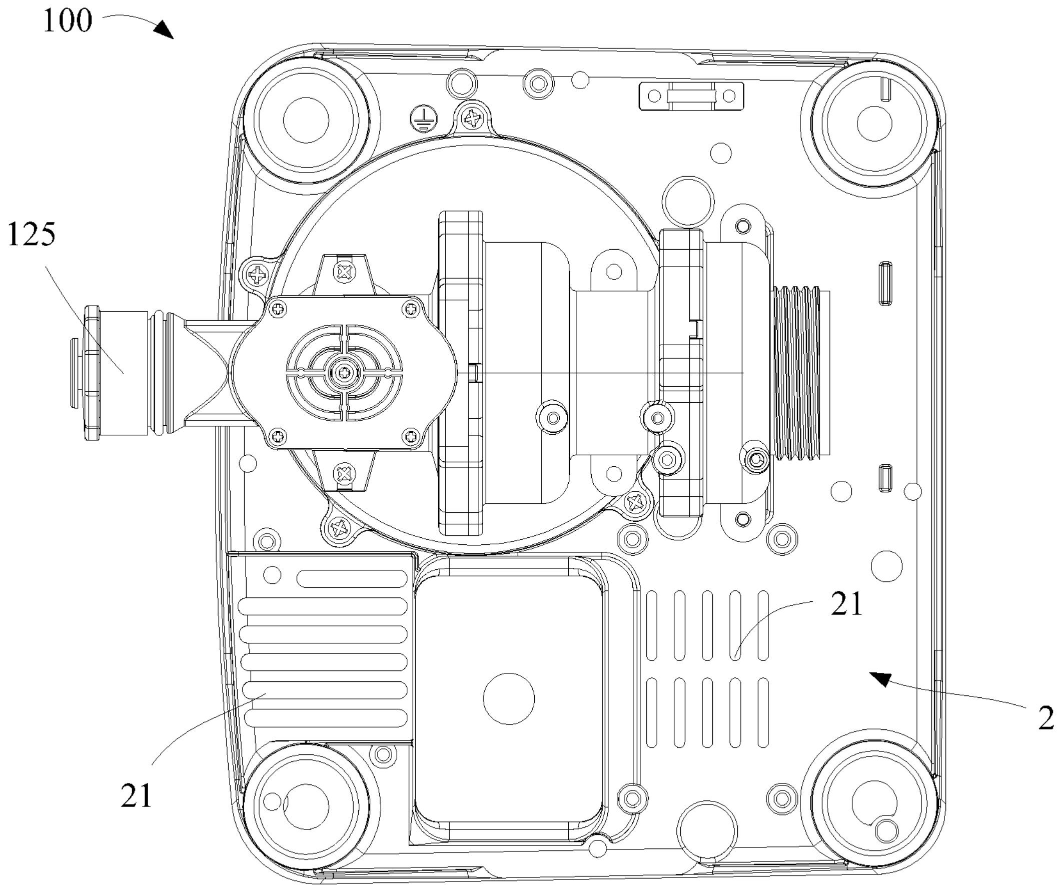
FIG. 3 is a section view along A-A of FIG. 2.

With reference to FIG. 1-FIG. 3, an embodiment provides a control box 100, including an air supply system 1 used for supplying air to a water pool body (not shown). A first chamber 2 is arranged in the control box 100, and accommodates control components (not shown), and the control components are used for controlling the operation of the air supply system 1 and/or other systems (such as a water circulation system).

In the embodiment, the air supply system 1 includes:

- an air suction part 11, being provided with a housing 111 which is provided with an air inlet 111*a* and an air outlet 111*b*, wherein the air inlet 111*a* communicates with the first chamber 2; the air suction part 11 further including an air pump 112 which is arranged in the housing 111, wherein when the air pump 112 is started, air in the first chamber 2 can be suctioned into the housing 111 through the air inlet 111*a*; and
- a valve part 12, being provided with a pipeline which is provided with an air intake port 124 and an air supply port 125, wherein the air intake port 124 communicates with the air outlet 111*b* of the housing 111, the air supply port 125 is used for communicating with the water pool body, and when the valve part 12 is started, air suctioned into the housing 111 can flow into the water pool body along the pipeline.

According to the control box 100 provided by the embodiment, when the air pump 112 is started, an air path is as shown in an arrow direction of FIG. 2: a, air is suctioned from the first chamber 2 to the air inlet 111*a* in the housing 111; b, the air flows from the air inlet 111*a* of the housing 111 to an air pumping end of the air pump 112; c, after flowing out of an air exhaust end of the air pump 112, the air flows to the air outlet 111*b* of the housing 111; and d, the air flows from the air outlet 111*b* of the housing 111 into the pipeline of the valve part 12, and finally the air is supplied to the water pool body.

It can be seen that in the embodiment, when the air pump 112 is started, the air pump 112 suctions air from the first chamber 2 instead of directly suctioning air from the outside of the control box 100 as in the prior art. Therefore, when the air pump 112 works, air in the first chamber can be suctioned to the outside of a cabinet body of the control box 100 through the air supply system 1, so that circulation and renewal of air in the first chamber 2 can be realized, thereby avoiding the accumulation of humid air. Therefore, according to the control box provided by the embodiment, the first chamber has a dry working environment, so that the service life of the control components accommodated in the first chamber can be prolonged.

With reference to FIG. 2, an air filter 113 is arranged at the air inlet 111*a* of the housing 111, and in the embodiment, the air filter 113 is sponge. However, the present invention is not limited thereto, and in other embodiments, the air filter may also be a filter membrane or the like, as long as it can play the role of filtering air.

In the embodiment, the air suction part 11 is adjacent to the first chamber 2 in a horizontal direction. In other words, in the embodiment, the first chamber 2 is arranged around the air suction part 11, through the arrangement, an air flow path can be shortened, the air pumping efficiency of the air pump 112 from the first chamber 2 can be improved, and the volume of the control box can be reduced.

The air pump 112 is a product which can be directly purchased and/or customized, specifically, the air pump 112 includes a motor and a fan driven by the motor, and an enclosure is arranged outside the fan. For the air pump 112, one end of the enclosure of the fan has a larger outer diameter, and one end of the motor has a smaller outer diameter. When the motor drives the fan to rotate, the air pump 112 can suction air from one end of the fan to one end of the motor. In the traditional design experience, the air pump is arranged in an upright mode in the control box, that is, one end of the fan is located below, and one end of the motor is located above.

In the embodiment, the applicant breaks through the conventional arrangement mode, the air pump 112 is arranged in the control box 100 in an inverted mode, and through the arrangement, at least the following technical effects are achieved:

(1) The mounting structure of the air pump can be simplified, and the volume of the control box is reduced. In the conventional design, the air pump is upright, the enclosure of the fan is located below, and a bearing structure for bearing the weight of the air pump is mounted below the enclosure of the fan. Since the outer diameter of the enclosure of the fan is large, the outer diameter of the bearing structure matched with the enclosure of the fan is larger. In addition, since an air pumping opening of the air pump is located in the center of the fan, a corresponding air channel needs to be designed in the center of the bearing structure, and in this way, the air pump in the prior art is complex in structure and is larger in volume. After the air pump is arranged in an inverted mode, the motor with the smaller outer diameter is located below, the bearing structure only needs to be matched with the motor in the outer diameter, an air channel does not need to be arranged in the bearing structure, and therefore, the structure can be simplified, and the size can be reduced.

Specifically, in the embodiment, the mounting structure of the air pump 112 refers to a shoulder part 115 and a bearing part 114 arranged on an inner wall of the housing 111, wherein the bearing part 114 is arranged below the air pump 112 and used for supporting the weight of the air pump 112; the shoulder part 115 is located above the bearing part 114 and used for providing radial support for the air pump 112. Further, the bearing part 114 is a tray arranged on a bottom wall of the housing 111, the shoulder part 115 is a step arranged on a side wall of the housing 111, and through the arrangement, the mounting structure of the air pump 112 can be simplified maximally.

(2) An air flow path is optimized. Since the air pump 112 is arranged in an inverted mode, and the air pumping opening of the air pump 112 faces upwards, the air pumping opening of the air pump 112 can conveniently communicate with the first chamber 2. Specifically, in the embodiment, the air inlet 111*a* is formed in a top wall of the housing 111, and the air pumping end of the air pump 112 is opposite to the air inlet 111*a*, so that the air pumping opening of the air pump 112 can communicate with the first chamber 2. Further, air holes 21 are formed in a bottom wall of the first chamber 2, air outside the control box 100 flows into the first chamber 2 through the air holes 21, and therefore, an air flow direction of the first chamber 2 is as shown in the arrow direction in FIG. 2. The air holes 21 of the control box 100 are formed in the bottom wall of the first chamber 2, so that the presence of air flowing dead angles in the first chamber 2 can be avoided, and also the appearance of the control box 100 can be kept complete.

Further, in the embodiment, the air outlet 111*b* of the housing 111 is located in the bottom wall of the housing 111, the valve part 12 is located below the housing 111, and the air intake port 124 of the valve part 12 is in butt joint with the air outlet 111*b* of the housing 111. In the embodiment, the air suction part 11 and the valve part 12 are arranged in an up-down direction, the valve part 12 is located below the air suction part 11, and through the arrangement, the control box has a compact structure. Further, the air outlet 111*b* of the housing 111 is adjacent to one side wall of the control box 100, so that the structure of the control box 100 can be further simplified.

In the embodiment, a water pool is a massage water pool, and the air supply system 1 of the control box 100 is used for supplying air to a water pool body of the massage water pool. Specifically, the air supply system 1 not only can inflate the water pool body and also can spray bubbles into the water pool body so as to provide water for massaging. Correspondingly, the air supply port 125 at least includes a first air supply port 125*a* and a second air supply port 125*b*, wherein the first air supply port 125*a* is used for spraying air bubbles into the water pool body of the massage water pool, and the second air supply port 125*b* is used for inflating the water pool body.

Specifically, the valve part 12 includes a first pipeline 121, a second pipeline 122, and a third pipeline 123, wherein the air intake port 124 is formed in the first pipeline 121, the first air supply port 125*a* is formed in the second pipeline 122, and the second air supply port 125*b* is formed in the third pipeline 123. In order to further reduce the volume of the control box 100, in the embodiment, the center lines (including a center line of the first pipeline 121, the center line of the second pipeline 122 and the center line of the third pipeline 123) of the pipelines and the center line of the air pump 112 are located in the same vertical plane. Optionally, the center line of the first pipeline 121 extends in a vertical direction, and the center line of the second pipeline 122 and the center line of the third pipeline 123 extend in the horizontal direction respectively.

In the embodiment, the valve part is a check valve, which can guarantee the unidirectional flowing of air in the first pipeline 121, the second pipeline 122 and the third pipeline 123, and prevent water in the water pool body from flowing back into the air supply system 1.

Further, a water circulation pipeline is further arranged in the first chamber 2 of the control box 100, and a heating device is arranged on a path of the water circulation pipeline and can heat water in the water pool body. Specifically, the water circulation pipeline includes an inlet and an outlet which are connected with the water pool body, and water in the water pool body flows to the water circulation pipeline from the inlet, is heated by the heating device and then flows back to the water pool body from the outlet, so that the water in the water pool body is maintained at a proper temperature.

In the embodiment, as the air pump 112 can suction air in the first chamber 2, even if the water circulation pipeline is arranged in the first chamber 2, air in the first chamber 2 can be kept dry.

An embodiment of the present invention further provides a massage water pool, including a water pool body, and the control box 100 provided by any one of the above embodiments. The air supply port 125 of the air supply system 1 of the control box 100 is connected with the water pool body. When the air pump 112 of the air supply system 1 is started, the water pool body can be inflated and/or bubbles can be sprayed into the water pool body.

In conclusion, the above embodiments provided by the present invention only exemplarily illustrate the principle and effects of the present invention, rather than limiting the present invention. Those skilled in the art can modify or change the above embodiments without violating the spirit and scope of the present invention. Therefore, all equivalent modifications or changes, which are generally completed by those of ordinary skill in the art without departing from the spirit and technical thoughts disclosed by the present invention, still should be covered by the claims of the present invention.

The invention claimed is:

1. A control box, characterized by being internally provided with a first chamber which is used for accommodating a control component, and being further internally provided with an air supply system which is used for supplying air to a water pool body and comprises:

an air suction part, being provided with a housing which is provided with an air inlet and an air outlet, wherein the air inlet communicates with the first chamber; the air suction part further including an air pump arranged in the housing; wherein the air pump is arranged in an inverted mode, the air inlet is formed in a top wall of the housing, and an air pumping end of the air pump is arranged opposite to the air inlet; wherein air in the first chamber can be suctioned into the housing through the air inlet when the air pump is started; and a valve part, being provided with a pipeline, wherein the pipeline is provided with an air intake port and an air supply port, the air intake port communicates with the air outlet of the housing, and the air supply port is used for communicating with the water pool body, and when the valve part is started, air suctioned into the housing can flow into the water pool body along the pipeline.

2. The control box according to claim 1, characterized in that the air suction part is adjacent to the first chamber in a horizontal direction.

3. The control box according to claim 1, characterized in that a bearing part and a shoulder part located above the bearing part are arranged on an inner wall of the housing, and the air pump is fixed in the housing through the shoulder part and the bearing part.

4. A massage water pool, characterized by comprising the control box according to claim 3.

5. The control box according to claim 1, characterized in that air holes are formed in a bottom wall of the first chamber.

6. A massage water pool, characterized by comprising the control box according to claim 5.

7. The control box according to claim 1, characterized in that the air outlet of the housing is located in a bottom wall of the housing, and the air outlet of the housing is adjacent to one side wall of the control box.

8. The control box according to claim 7, characterized in that the valve part is located below the housing.

9. A massage water pool, characterized by comprising the control box according to claim 7.

10. A massage water pool, characterized by comprising the control box according to claim 7.

11. The control box according to claim 1, characterized in that the control box is used for a massage water pool; and the air supply port at least comprises a first air supply port and a second air supply port, wherein the first air supply port is used for spraying bubbles into a water pool body of the massage water pool, and the second air supply port is used for inflating the water pool body.

12. The control box according to claim 11, characterized in that a center line of the pipeline and a center line of the air pump are located in a same vertical plane.

13. The control box according to claim 11, characterized in that the valve part is a check valve.

14. The control box according to claim 1, characterized in that an air filter is arranged at the air inlet.

15. The control box according to claim 1, characterized in that a water circulation pipeline is further arranged in the first chamber of the control box.

16. A massage water pool, characterized by comprising the control box according to claim 1.

17. A massage water pool, characterized by comprising the control box according to claim 2.

* * * * *